United States Patent
Mui et al.

(10) Patent No.: US 9,713,120 B2
(45) Date of Patent: Jul. 18, 2017

(54) METHOD AND A GATEWAY NODE FOR REDUCING PAGING TRAFFIC IN A WIRELESS COMMUNICATION SYSTEM

(71) Applicant: Hong Kong Applied Science and Technology Research Institute Company Limited, Hong Kong (HK)

(72) Inventors: Ka Ho Mui, Hong Kong (HK); Shijun Fan, Hong Kong (HK); Yau Yau Yolanda Tsang, Hong Kong (HK); Yee Simon Wong, Hong Kong (HK); Hua Shen, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 120 days.

(21) Appl. No.: 14/953,437

(22) Filed: Nov. 30, 2015

(65) Prior Publication Data
US 2017/0156128 A1    Jun. 1, 2017

(51) Int. Cl.
*H04W 68/02* (2009.01)
*H04L 12/801* (2013.01)
(Continued)

(52) U.S. Cl.
CPC ........... *H04W 68/02* (2013.01); *H04L 45/742* (2013.01); *H04L 47/12* (2013.01); *H04L 69/326* (2013.01); *H04W 88/16* (2013.01)

(58) Field of Classification Search
CPC ..... H04W 68/02; H04W 68/04; H04W 88/16; H04W 68/025; H04W 84/02; H04W 4/02;
(Continued)

(56) References Cited

U.S. PATENT DOCUMENTS 6,351,641 B2   2/2002   Verkama
8,428,625 B2   4/2013   Ramankutty et al.
(Continued)

FOREIGN PATENT DOCUMENTS

EP   2254378 A1   11/2010
WO   WO2001080588 A1   10/2001
(Continued)

OTHER PUBLICATIONS

International Search Report and Written Opinion issued for PCT Application No. PCT/CN2015/095980 on Jul. 26, 2016.

*Primary Examiner* — Wutchung Chu
*Assistant Examiner* — Lalita Pace
(74) *Attorney, Agent, or Firm* — Spruson & Ferguson (Hong Kong) Limited

(57) ABSTRACT

A method for reducing paging traffic between a gateway (GW) and plural base stations (BSs) is provided when paging user equipments (UEs). A cache map, which records most-recently visited BSs of selected UEs, is used to limit the number of BSs in the paging of each selected UE, thereby reducing paging traffic. Furthermore, paging requests sent to the same BS node are grouped into one batch in generating a transport-layer payload, reducing the number of generated transport-layer messages. When used in a LTE system, piggybacking paging requests as provided by the SCTP reduces paging traffic and windowing/congestion control overhead at the transport layer. Transmission efficiency is thus improved. In addition, the number of paging requests sent out by the GW node per one paging interval is controlled to be not greater than a pre-determined maximum value to further limit paging traffic for avoiding occurrence of a paging storm.

14 Claims, 4 Drawing Sheets

(51) Int. Cl.
*H04L 12/747* (2013.01)
*H04L 29/08* (2006.01)
*H04W 88/16* (2009.01)

(58) Field of Classification Search
CPC ....... H04W 8/08; H04W 60/00; H04W 64/00; H04W 48/16; H04W 74/006; H04L 45/742; H04L 47/12; H04L 29/08657; G01S 5/02; G01S 5/0252
USPC .............................................. 455/456.1, 515
See application file for complete search history.

(56) References Cited

U.S. PATENT DOCUMENTS

| | | |
|---|---|---|
| 8,537,829 B2 | 9/2013 | Mehta |
| 2010/0124223 A1* | 5/2010 | Gibbs ................... H04W 28/06 370/389 |
| 2010/0165917 A1 | 7/2010 | Ishida |
| 2010/0255841 A1 | 10/2010 | Kubo et al. |
| 2013/0084894 A1* | 4/2013 | Jain ................... H04W 28/0215 455/458 |
| 2013/0316706 A1* | 11/2013 | Knauft ................. H04W 68/04 455/435.1 |
| 2014/0106790 A1* | 4/2014 | Kakinada .............. H04W 68/02 455/458 |
| 2014/0155109 A1 | 6/2014 | Vaidya et al. |
| 2014/0370922 A1 | 12/2014 | Richards |
| 2015/0188826 A1* | 7/2015 | Thodupunoori ........ H04L 47/24 370/392 |
| 2015/0249969 A1 | 9/2015 | Tamura et al. |

FOREIGN PATENT DOCUMENTS

| | | |
|---|---|---|
| WO | WO2011026663 A2 | 3/2011 |
| WO | 2014012568 A1 | 1/2014 |
| WO | WO2014057101 A1 | 4/2014 |

* cited by examiner

METHOD AND A GATEWAY NODE FOR REDUCING PAGING TRAFFIC IN A WIRELESS COMMUNICATION SYSTEM

FIELD OF THE INVENTION

The present invention generally relates to paging in a wireless communication system. In particular, the present invention relates to a method and a gateway node for reducing paging traffic by means of caching, scheduling and transmission optimization.

BACKGROUND

A wireless communication system, such as a mobile communication system using a Long Term Evolution (LTE) specification, has been moving to a flatter, all-IP architecture in which base stations (BSs) are directly, or indirectly, connected to a packet core network (CN) through some gateways (GWs). There is a trend that small cells, such as femtocells in the LTE system, are increasingly deployed for supporting communications with more user equipments (UEs) per unit area. Due to the high density of small cells located in a given area, it is typical that a GW is connected with hundreds or thousands of small cells.

Paging is a procedure of locating a UE in a wireless communication system. It usually generates a significant amount of paging traffic on the links between the GW and the BSs due to the large number of BSs as well as the large number of potential UEs to be paged. Note that the links are usually implemented as part of an Internet Protocol (IP) network. It is desirable if the amount of paging traffic can be reduced.

In the art, techniques for reducing the amount of paging traffic usually employ one the following two approaches: limiting the number of cells or BSs to do paging to thereby limit the paging traffic; and deciding whether or not to page a target UE.

Techniques based on limiting the number of cells or BSs to do paging include the following. U.S. Pat. No. 8,428,625 suggests a technique that first pages a subset of the total number of cell sites in a tracking area (TA) and then expands the subset after unsuccessful attempts to page a UE. In U.S. Pat. No. 6,351,641, a method for re-paging is disclosed. An area according to the location information is divided into a number of sub-areas. If re-paging is required, the number of re-pagings to be performed in each cell within the area is limited based on a limitation value. In WO2014057101, a permanent user identity is used to determine a set of small cells to page a UE based on a small cell last visited by the UE and small cells that are neighbors of the last-visited small cell. US2015249969 discloses a GW device that stores information regarding an environment around a BS and that selects the cells to be paged for an UE based on the stored information. In EP2254378, a method is provided for a GW to page a UE that is in idle mode and resides within a cluster of femtocells. The GW determines whether which femtocells to be involved in paging according to a UE identifier and an identity of at least one femtocell that the UE previously visited. US20140370922 suggests using a table to map a UE and a candidate BS that has some likelihood of successfully paging the UE, thereby some paging traffic can be saved by focusing on this candidate BS in paging.

Techniques based on deciding whether or not to page a target UE include the following. U.S. Pat. No. 8,537,829 suggests that paging may not be needed by determining if a bearer connection or link is in the process of being established, thereby enabling a reduction of paging traffic for the system. In US20100124223, a GW having intelligence to determine whether or not to page a particular UE is disclosed. The GW determines to page the UE when the UE is in an idle state or when one or more selective paging rules are satisfied. In WO2011026663, a method for determining whether or not to page a UE is suggested, based on a bearer identification and a framework table comprising a number of selection criteria entries for BS name, quality of service class indicator, etc.

Furthermore, WO2001080588 suggests a system using multicasting to transmit paging requests from a GW to a plurality of BSs for optimizing paging efficiency. Nonetheless, the use of multicasting is not compliant to major wireless communication standards such as the LTE specification.

It is advantageous to have a technique for reducing paging traffic based on a new approach different from the aforementioned two approaches while maintaining compliance with major wireless communication standards, such that a greater potential in reducing paging traffic is realizable in practice. There is a need in the art for such technique.

SUMMARY OF THE INVENTION

An aspect of the present invention is to provide a method for paging UEs in a wireless communication system. The system comprises a GW node and plural BS nodes communicable with the GW node via an IP-based communication network. The GW node is arranged to receive paging requests from elsewhere in the system. Each paging request includes information for identifying a target UE to be paged.

In the method, the GW node creates and updates a cache map comprising entries each for caching a selected UE and either a BS node or a TA most-recently visited by the selected UE, where the TA is a subset of the BS nodes.

When a new paging request is received by the GW node, the GW node buffers the new paging request into an outgoing queue of the GW node unless the outgoing queue has already contained a paging request having the target UE same as the target UE identified by the new paging request. Furthermore, the GW node determines one or more destination BS nodes to which the new paging request is to be sent. If the target UE identified by the new paging request is recorded in the cache map, the one or more destination BS nodes are determined to be the subset of the BS nodes corresponding to the most-recently visited TA, or corresponding to the TA that includes the most-recently visited BS node.

The outgoing queue is periodically updated with any paging request in an outgoing buffer every paging interval. The outgoing buffer is arranged to store any paging request not yet sent out in a previous paging interval. Furthermore, the outgoing queue is reorganized such that plural paging requests therein to be sent to the same destination BS node are collectively located and grouped as one cluster in the outgoing queue for easy retrieval.

During each paging interval, the GW node transmits some or all of the paging requests extracted from the outgoing queue to respective destination BS nodes. In particular, the transmitting of some or all of the paging requests is arranged such that the following four conditions are satisfied. First, before transmission, plural paging requests to be sent to the same destination BS node are grouped into one batch in generating a transport-layer payload according to a transport-layer protocol in order to reduce the number of generated transport-layer messages in comparison to sending the paging requests individually. Second, the number of paging requests dispatched to one destination BS node over one paging interval is controlled such that each generated transport-layer message does not result in a packet size exceeding a limitation value as required by the IP-based communication network. Third, transmission of paging requests by the GW node is scheduled such that the number of paging requests sent out by the GW node per one paging interval does not exceed a first pre-determined maximum value for limiting paging traffic. Fourth, the number of BS nodes to receive paging requests over one paging interval is controlled to be not greater than a second pre-determined maximum value for reducing the total number of transport-layer messages per paging interval.

Each of the embodiments of the disclosed method is implementable in a GW node comprising a transceiver and one or more computing processors.

Other aspects of the present invention are disclosed as illustrated by the embodiments hereinafter.

DETAILED DESCRIPTION

Figure 1:
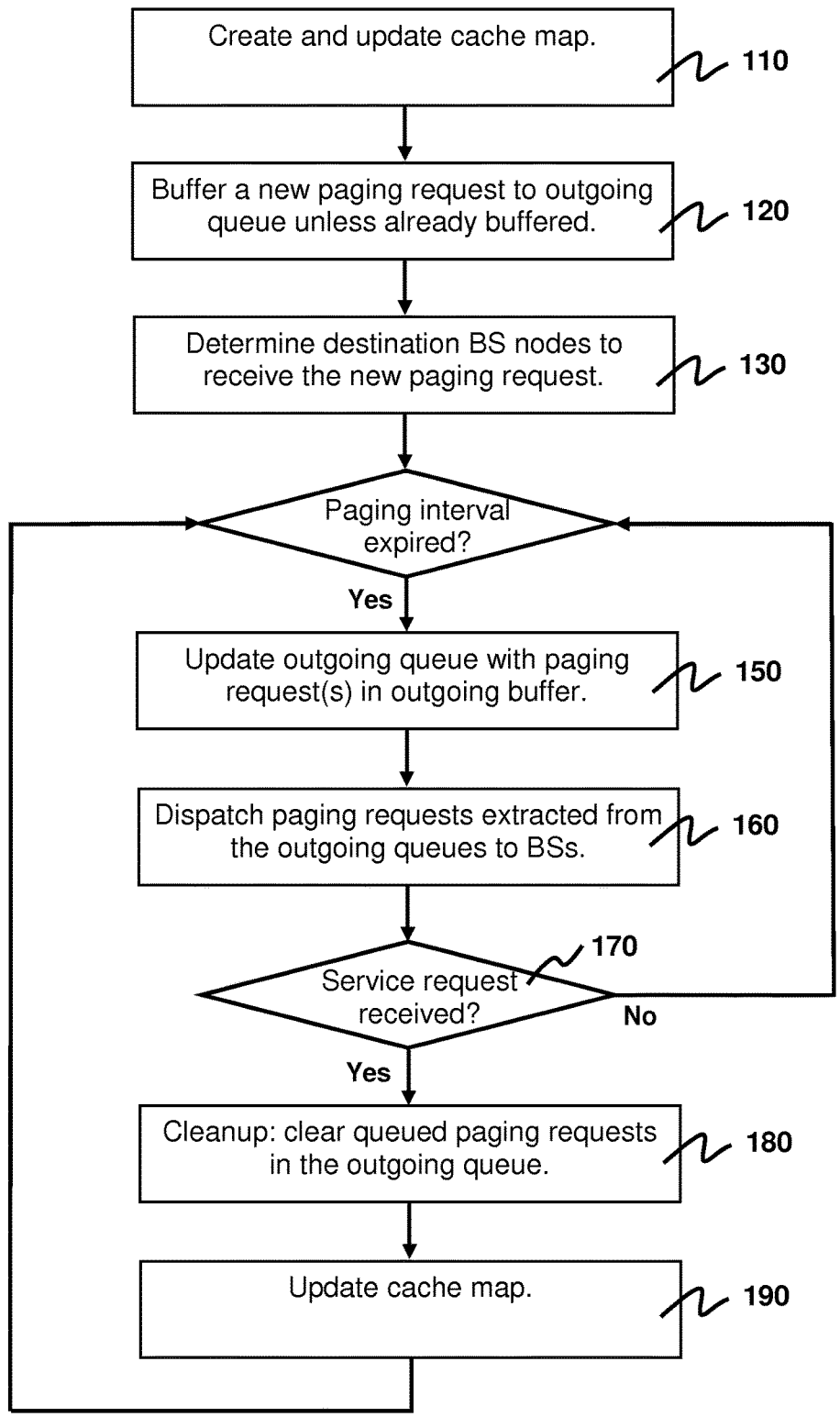
FIG. 1 depicts, in accordance with an exemplary embodiment of the present invention, a flowchart illustrating a method for paging a UE with a goal of reducing paging traffic and improving transport-layer efficiency in communication between a GW node and plural BS nodes.

The following definitions are used herein in the specification and the appended claims. A "user equipment" (i.e. UE) is a mobile communication device or a mobile station that wirelessly communicates with a BS for data transmission. A UE may be a mobile computing device such as a smart phone or a notebook computer. Since a wireless communication system is desired to page the UE through the BS, the UE is a device registered with the wireless communication system. A "node" in a wireless communication system means a device, or a system having plural devices, comprising one or more communication interfaces for communicating with other devices or UEs, and one or more computing processors/servers for performing computation and control tasks. Furthermore, the node is characterized by performing a specific function in the wireless communication system. For example, a GW node refers to a GW. One communication interface of the GW node is an IP-enabled port for communicating with other IP-enabled devices in the packet CN of the wireless communication system, such as a mobility management entity (MME). In another example, a BS node refers to a BS. A "tracking area" (i.e. TA) means a cluster of BSs where the BSs are arranged to collectively take an action in tracking a location of a UE. A "most-recently visited BS" of a UE is, among all BSs in the wireless communication system, the latest BS that the UE established a communication link with. A "most-recently visited TA" of a UE is the TA that includes the most-recently visited BS of the UE. A "queue" is interpreted in the sense of computing, and is a collection of entities kept in order. The queue has a front end and a rear end. The entity positioned at the front end has a higher priority of being retrieved or extracted from the queue than the one positioned at the rear end does.

In the disclosure herein, both of the terms "paging request" and "paging message" bear the same meaning, and mean a data message having information that identifies a target UE to be paged. These two terms are used interchangeably herein. In addition, both of the terms "femtocell" and "small cell" bear the same meaning. These two terms are used interchangeably herein.

Although the invention is hereinafter described in embodiments predominantly based on an example application of the invention to a LTE system, the present invention is not limited only to a wireless communication system compliant to a LTE specification. The present invention is applicable to any wireless communication system having a GW node communicating with plural BS nodes via an IP-based communication network.

As mentioned above, a significant amount of paging traffic appears on the links between a GW node and BS nodes. Since there are a large number of paging messages sent from the GW node to the BS nodes, especially in the presence of small cells, there are also a large number of transport-layer messages generated. In particular, an excessively large number of transport-layer messages give rise to a paging storm. The presence of a large number of transport-layer messages appeared over a short time increases the likelihood of packet loss. Consider the LTE system. The Stream Control Transmission Protocol (SCTP) is used as the transport-layer protocol for transmitting paging requests from the GW node to the BS nodes. As the rate of packet loss increases, both the sender (i.e. the GW node) and the receiver (namely, a BS node) adjust the window size for flow control according to the SCTP. Although windowing prevents message flooding, network congestion is experienced, thus increasing latency in message transmission. It is advantageous to improve transport-layer efficiency so as to reduce the likelihood of, or even preventing, the occurrence of paging storm.

An aspect of the present invention is to provide a method for paging UEs in a wireless communication system with a goal of reducing paging traffic and improving transport-layer efficiency. The wireless communication system comprises a GW node and plural BS nodes communicable with the GW node via an IP-based communication network. In the LTE system, the GW node and at least one of the BS nodes may be a femtocell GW and a femtocell BS, respectively. The GW node is arranged to receive paging requests from elsewhere in the system such as a MME. The method is exemplarily illustrated as follows with an aid of FIG. 1, which depicts a flowchart showing a process flow of the method. The steps disclosed herein in the method are performed by the GW node.

In a step 110, the GW node creates a cache map at start-up, or updates the cache map afterwards, where the cache map comprises entries each for caching a selected UE and either a BS node or a TA most-recently visited by the selected UE. The TA is a subset of the BS nodes. The function of the cache map is to record UEs and their most-recently visited BS nodes or most-recently visited TAs, enabling the GW node to track the locations of a certain number of UEs.

In the GW node, an outgoing queue is used for storing the received paging requests. When the GW node receives a new paging request, the new paging request is buffered into the outgoing queue unless the outgoing queue has already contained a paging request having the target UE same as the target UE identified by the new paging request (step 120).

For the new paging request, the GW node determines one or more destination BS nodes to which the new paging request is to be sent (step 130). The cache map can be advantageously used in determining the one or more destination BS nodes and limiting the number of the determined destination BS nodes, thereby allowing the paging traffic to be reduced. If the target UE identified by the new paging request is already cached by the cache map, the one or more destination BS nodes are determined to be the subset of the BS nodes corresponding to the most-recently visited TA, or corresponding to the TA that includes the most-recently visited BS node.

In the disclosed method, dispatch of the paging requests to the determined destination BS nodes is periodically performed with a period of a pre-determined time duration, which is herein referred to as a paging interval. In a preferred embodiment, the paging interval is suggested to be no more than one second. This is mainly for controlling the latency to dispatch paging messages to be less than 1 second and for performance measurement purpose. Typically, one second is used for statistical purpose, e.g. 100 paging messages per second.

The GW node periodically updates the outgoing queue every paging interval. In particular, the outgoing queue is updated with any paging request not yet transmitted in the previous paging interval and left in an outgoing buffer (step 150). In each paging interval, the outgoing queue is further reorganized such that plural paging requests therein to be sent to the same destination BS node are located and grouped as one cluster in the outgoing queue for easy retrieval.

During each paging interval, the GW node extracts some or all of the paging requests from the outgoing queue and transmits the extracted paging requests to respective destination BS nodes (step 160). In particular, the transmission is arranged such that the following four conditions are satisfied.

First, before transmission, plural paging requests to be sent to the same destination BS node are grouped into one batch in generating a transport-layer payload according to a transport-layer protocol in order to reduce the number of generated transport-layer messages when compared to sending the paging requests individually. Take the LTE system as a case for illustration. The transport-layer protocol employed by the LTE system for data communication between the GW node and any BS node is the SCTP, so that the transport-layer payload is a SCTP payload. The SCTP has a provision known as piggybacking for grouping the paging requests destined to the same destination BS node with a result that the number of resultant SCTP messages is reduced. This reduction is advantageously utilized in a direct reduction of paging traffic. Another advantage of having less number of SCTP messages is that the windowing/congestion control overhead experienced at the transport layer is reduced, further reducing the paging traffic as well as improving the transmission efficiency.

Second, the GW node controls the number of paging requests dispatched to one destination BS node over one paging interval such that each generated transport-layer message does not result in a packet size exceeding a limitation value as required by the IP-based communication network. For example, the maximum packet size allowable to transmit on a TCP/IP network at present is 1500 bytes, and thus each transport-layer message is required to be limited to a packet size of less than or equal to 1500 bytes.

Third, the GW node schedule its transmission of paging requests such that the number of paging requests sent out by the GW node per one paging interval does not exceed a first pre-determined maximum value for limiting paging traffic. When the transport-layer protocol is the SCTP as in the LTE system, preferably this maximum value is determined in order to avoid triggering the aforesaid window size adjustment algorithm at the GW node.

Fourth, the GW node controls the number of BS nodes to receive paging requests over one paging interval to be not greater than a second pre-determined maximum value. The aim of this limitation is to reduce the total number of transport-layer messages per paging interval, thereby limiting the paging traffic.

At the end of the paging interval, any paging request not yet transmitted due to satisfying the aforementioned four conditions are left over in the outgoing buffer. As mentioned above, such left-over paging request(s) are to be used in updating the outgoing sequence in the step 150 in the next paging interval.

In a step 170, the GW node determines whether or not one or more UEs respond to the paging requests broadcast by the one or more destination BS nodes over radio coverage areas thereof. When a service request issued from a responding UE in response to paging is received by the GW node, the GW node removes one or more paging requests in the outgoing queue where the target UE identified in each of the one or more paging requests is the responding UE (step 180). In addition, the cache map is updated with information on the BS node or the TA most-recently visited by the responding UE (step 190).

It is advantageous if a paging request having a higher likelihood of successfully getting a response from the target UE identified therein is broadcast by a destination BS node earlier than another paging request having a lower likelihood. This prioritization has an effect that the response is obtained in an earlier time, so that the remaining paging requests directed to page the same target UE but not yet broadcast by other destination BSs can be removed from the outgoing queue in an earlier time too, thereby reducing the paging traffic.

Figure 2:
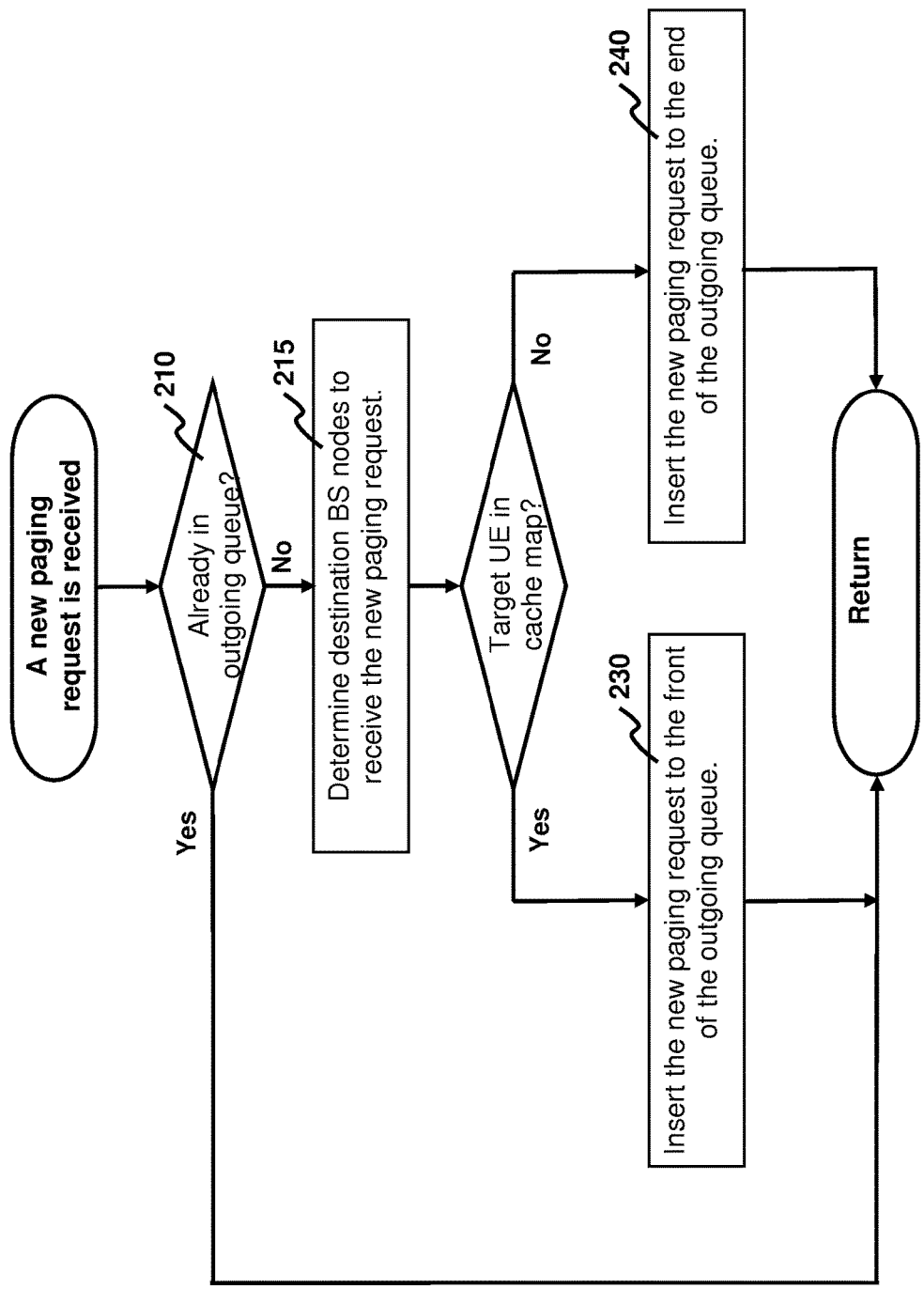
FIG. 2 depicts, in accordance with one embodiment of the present invention, a sub-process of buffering a new paging request to an outgoing queue and determining destination BS nodes to receive the new paging request, where a prioritization effect is provided such that a paging request having a higher likelihood of successfully getting a response from the target UE identified therein may be broadcast by a destination BS node earlier than another paging request having a lower likelihood.

FIG. 2 is a flowchart showing an embodiment of the steps 120 and 130 of buffering the new paging request to the outgoing queue and determining destination BS nodes to receive the new paging request, further achieving the aforesaid prioritization. When the new paging request is received, a check is performed to determine if the target UE identified in the new paging request is already recorded in the outgoing queue (step 210). If the outgoing queue already has a record of paging this target UE, the new paging request is not duplicated in the outgoing queue. Otherwise the one or more destination BS nodes for the new paging request are determined (step 215) based on the approach as detailed above. As an additional result of performing the step 215, whether the cache map has a record of a BS node or a TA most-recently visited by the target UE becomes known. If the cache map has this record, then insert the new paging request to the front of the outgoing queue (step 230), else insert the new paging request to the end of the outgoing queue (step 240).

Figure 3:
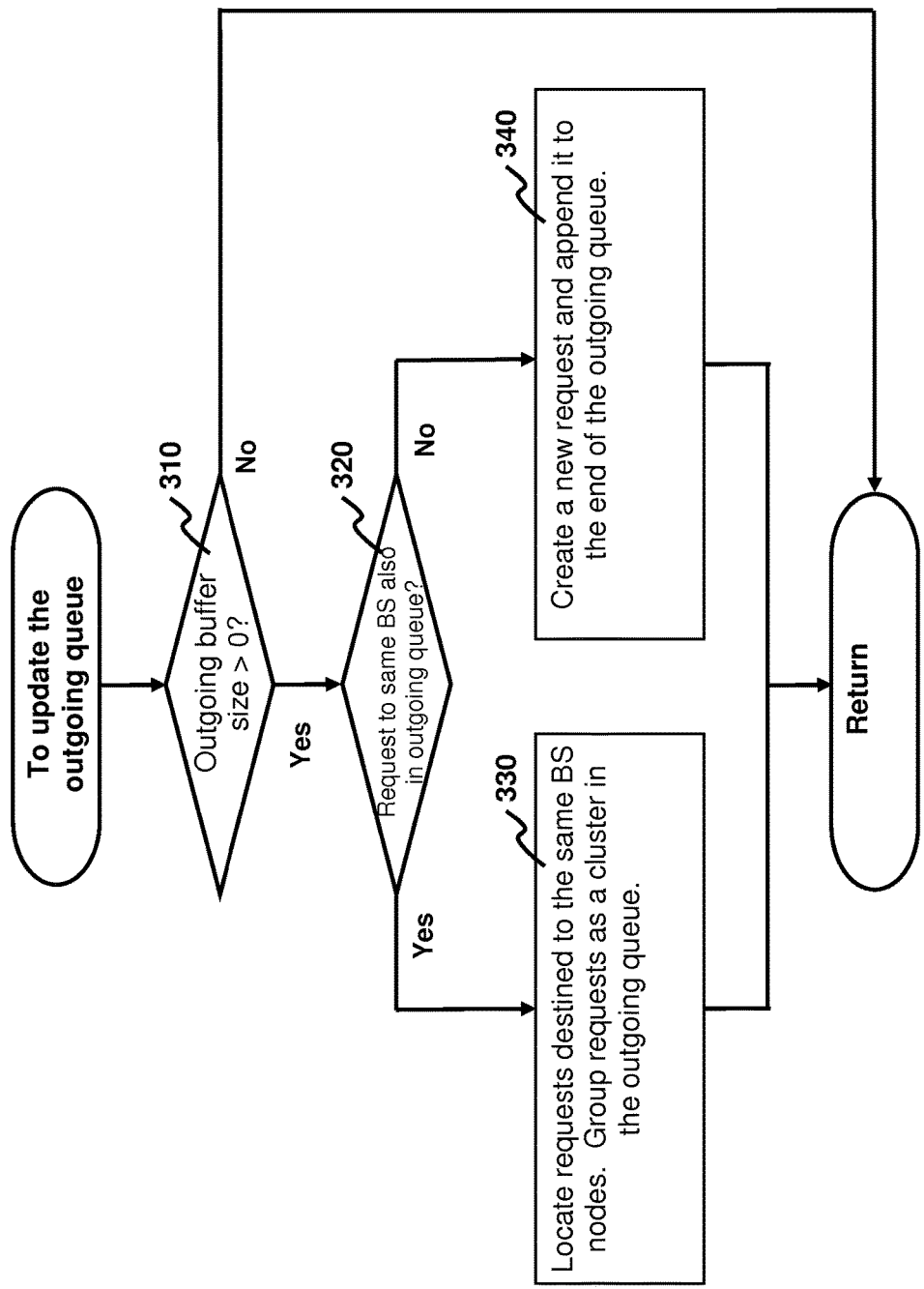
FIG. 3 depicts, in accordance with one embodiment of the present invention, a sub-process of updating the outgoing queue at each paging interval with any paging request not yet transmitted in the previous paging interval and left in an outgoing buffer.

FIG. 3 depicts a flowchart showing an embodiment of realizing the step 150 of updating the outgoing sequence. A step 310 is used to check if the outgoing buffer has one or more paging requests not yet transmitted in the previous paging interval. If the outgoing buffer is not empty, then each not-yet-transmitted paging request is examined and its destination BS node is considered. In a step 320, another check is performed to find out if the outgoing queue has at least one paging request to be sent to the same destination BS node as the not-yet-transmitted paging request. If it does, then locate all the paging requests having the same destination BS nodes in the outgoing queue, and group these paging requests with the non-yet-transmitted paging request together in a cluster (step 330). If not, then create a new paging request for the not-yet-transmitted paging request and append the newly-created paging request to the end of the outgoing queue (step 340).

Figure 4:
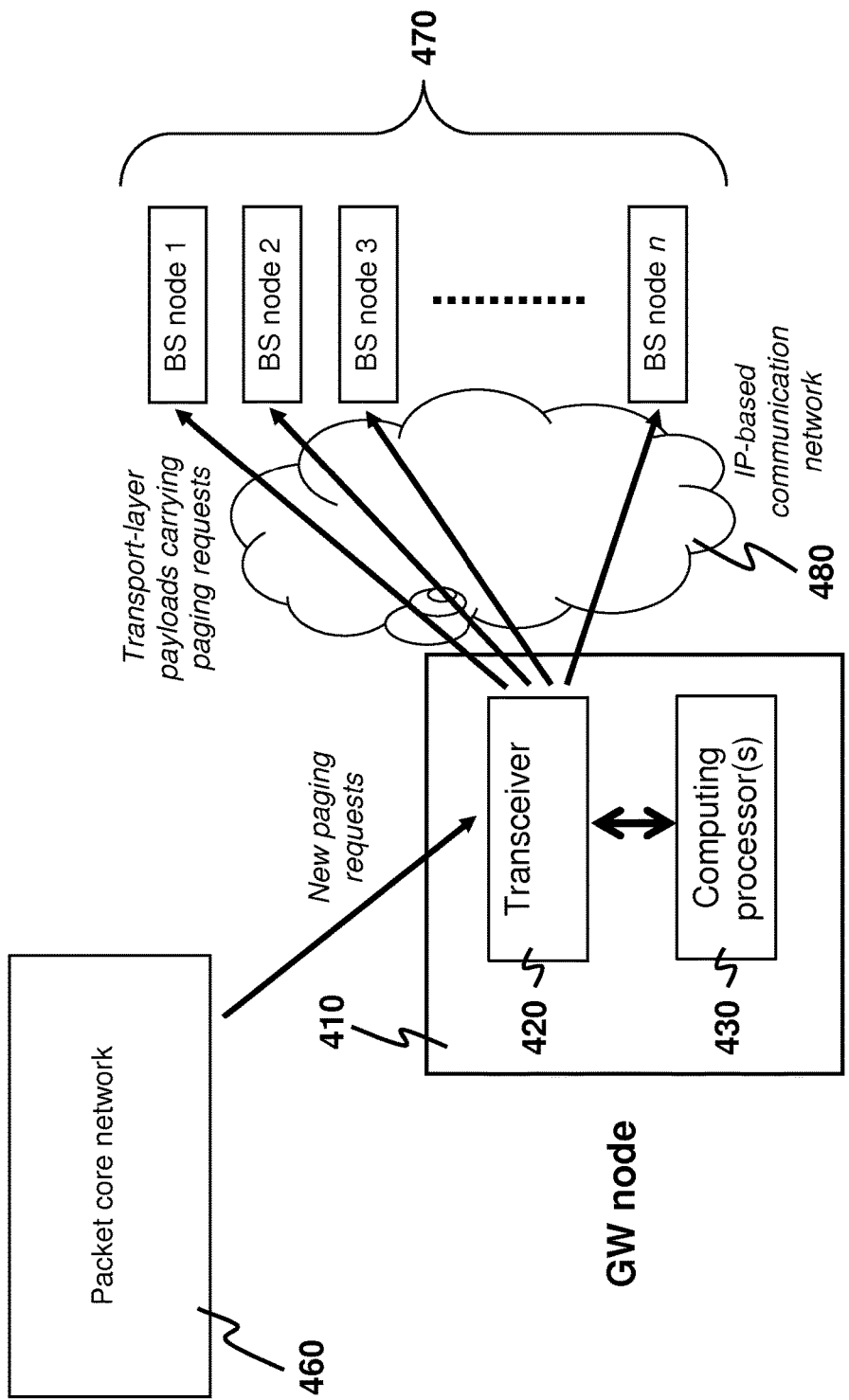
FIG. 4 depicts, for illustration, a situation in which a GW node implements the disclosed method.

Each of the embodiments of the method disclosed herein is implementable in a GW node for interfacing between a packet CN and a plurality of BS nodes. For illustration, FIG. 4 depicts a situation that a GW node 410 is configured to implement an embodiment of the disclosed method. The GW node 410 is configured to communicate with plural BS nodes 470 via an IP-based communication network 480, and comprises a transceiver 420 and one or more computing processors 430. The transceiver 420 is configured to receive paging requests from a packet CN 460, each paging request including information for identifying a target UE to be paged. The one or more computing processors 430 are configured to execute a paging-preparation process for generating transport-layer payloads of paging requests to be delivered. In addition, the transceiver 420 is further configured to transmit the transport-layer payloads to respective destination BS nodes 470. The paging-preparation process is configured to perform computing and controlling functions as set forth in any of the embodiments of the method disclosed herein.

The embodiments disclosed herein may be implemented using general purpose or specialized computing devices, computer processors, computing servers, or electronic circuitries including but not limited to digital signal processors (DSP), application specific integrated circuits (ASIC), field programmable gate arrays (FPGA), and other programmable logic devices configured or programmed according to the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for paging user equipments (UEs) in a wireless communication system, the system comprising a gateway (GW) node and plural base station (BS) nodes communicable with the GW node via an Internet Protocol- (IP-) based communication network, the GW node being arranged to receive paging requests from elsewhere in the system, each paging request including information for identifying a target UE to be paged, the method comprising:

creating and updating a cache map, by the GW node, comprising entries each for caching a selected UE and either a BS node or a tracking area (TA) most-recently visited by the selected UE, where the TA is a subset of the BS nodes;

when the GW node receives a new paging request, buffering, by the GW node, the new paging request into an outgoing queue of the GW node unless the outgoing queue has already contained a paging request having the target UE same as the target UE identified by the new paging request;

determining, by the GW node, one or more destination BS nodes to which the new paging request is to be sent, wherein if the target UE identified by the new paging request is recorded in the cache map, the one or more destination BS nodes are determined to be the subset of the BS nodes corresponding to the most-recently visited TA, or corresponding to the TA that includes a most-recently visited BS node;

periodically updating, by the GW node, the outgoing queue with any paging request in an outgoing buffer every paging interval, wherein the outgoing buffer is arranged to store any paging request not yet sent out in a previous paging interval, and the outgoing queue is further reorganized such that plural paging requests therein to be sent to a same destination BS node are located and grouped as one cluster in the outgoing queue for easy retrieval; and during each paging interval, transmitting, by the GW node, some or all of the paging requests extracted from the outgoing queue to respective destination BS nodes, wherein the transmitting of some or all of the paging requests is arranged such that:

before transmission, plural paging requests to be sent to the same destination BS node are grouped into one batch in generating a transport-layer payload according to a transport-layer protocol in order to reduce a number of generated transport-layer messages in comparison to sending the paging requests individually;

a number of paging requests dispatched to one destination BS node over one paging interval is controlled such that each generated transport-layer message does not result in a packet size exceeding a limitation value as required by the IP-based communication network;

transmission of paging requests by the GW node is scheduled such that the number of paging requests sent out by the GW node per one paging interval does not exceed a first pre-determined maximum value for limiting paging traffic; and a number of BS nodes to receive paging requests over one paging interval is controlled to be not greater than a second pre-determined maximum value for reducing a total number of transport-layer messages per paging interval.

2. The method of claim 1, wherein the buffering of the new paging request in the outgoing queue comprises:

positioning the new paging request in the outgoing queue according to whether the GW node is aware of the most-recently visited BS node or the most-recently visited TA of the target UE identified in the new paging request, such that the new paging request is inserted in a front end of the outgoing queue if the target UE is recorded in the cache map, and is appended in a rear end thereof if the target UE is not recorded in the cache map.

3. The method of claim 1, wherein the transport-layer protocol is the Stream Control Transmission Protocol (SCTP) and the transport-layer payload is a SCTP payload, and wherein the transmitting of some or all of the paging requests comprises:
according to the SCTP, piggybacking the paging requests destined to the same destination BS node to form the SCTP payload for grouping the paging requests into said one batch before transmission; and
transmitting the SCTP payload to the aforesaid same destination BS node.

4. The method of claim 1, further comprising:
when a service request issued from a responding UE in response to paging is received by the GW node, performing, by the GW node:
removing one or more paging requests in the outgoing queue where the target UE identified in each of the one or more paging requests is the responding UE; and
updating the cache map with information on the BS node or the TA most-recently visited by the responding UE.

5. The method of claim 1, further comprising:
receiving, by the GW node, the new paging request from a mobility management entity (MME) of the wireless communication system.

6. The method of claim 1, wherein the wireless communication system is compliant to a Long Term Evolution (LTE) specification.

7. The method of claim 6, wherein the GW node is a femtocell GW.

8. The method of claim 6, wherein at least one of the BS nodes is a femtocell BS.

9. A gateway (GW) node for interfacing between a packet core network and a plurality of base station (BS) nodes, configured to communicate with the BS nodes via an Internet Protocol- (IP-)based communication network, the GW node comprising a transceiver and one or more computing processors, wherein:
the transceiver is configured to receive paging requests from the packet core network, each paging request including information for identifying a target UE to be paged;
the one or more computing processors are configured to execute a paging-preparation process for generating transport-layer payloads of paging requests to be delivered; and
the transceiver is further configured to transmit the transport-layer payloads to respective destination BS nodes;
and wherein the paging-preparation process comprises:
creating and updating a cache map comprising entries each for caching a selected UE and either a BS node or a tracking area (TA) most-recently visited by the selected UE, where the TA is a subset of the BS nodes;
when the GW node receives a new paging request, buffering the new paging request into an outgoing queue unless the outgoing queue has already contained a paging request having the target UE same as the target UE identified by the new paging request;
determining one or more destination BS nodes to which the new paging request is to be sent, wherein if the target UE identified by the new paging request is recorded in the cache map, the one or more destination BS nodes are determined to be the subset of the BS nodes corresponding to the most-recently visited TA, or corresponding to the TA that includes a most-recently visited BS node;
periodically updating the outgoing queue with any paging request in an outgoing buffer every paging interval, wherein the outgoing buffer is arranged to store any paging request not yet sent out in a previous paging interval, and the outgoing queue is further reorganized such that plural paging requests therein to be sent to a same destination BS node are collectively located and grouped as one cluster in the outgoing queue for easy retrieval; and
during each paging interval, performing:
grouping plural paging requests to be sent to the same destination BS node into one batch in generating a transport-layer payload according to a transport-layer protocol in order to reduce a number of generated transport-layer messages in comparison to sending the paging requests individually;
controlling a number of paging requests dispatched to one destination BS node over one paging interval such that each generated transport-layer message does not result in a packet size exceeding a limitation value as required by the IP-based communication network;
scheduling transmission of paging requests such that the number of paging requests sent out by the GW node per one paging interval does not exceed a first pre-determined maximum value for limiting paging traffic; and
controlling a number of BS nodes to receive paging requests over one paging interval to be not greater than a second pre-determined maximum value for reducing a total number of transport-layer messages per paging interval.

10. The GW node of claim 9, wherein the paging-preparation process further comprises:
positioning the new paging request in the outgoing queue according to whether the GW node is aware of the most-recently visited BS node or the most-recently visited TA of the target UE identified in the new paging request, such that the new paging request is inserted in a front end of the outgoing queue if the target UE is recorded in the cache map, and is appended in a rear end thereof if the target UE is not recorded in the cache map.

11. The GW node of claim 9, wherein:
the transport-layer protocol is the Stream Control Transmission Protocol (SCTP) and the transport-layer payload is a SCTP payload;
the paging-preparation process further comprises:
according to the SCTP, piggybacking the paging requests destined to the same destination BS node to form the SCTP payload for grouping the paging requests into said one batch before transmission; and
the transceiver is further configured to transmit the SCTP payload to the aforesaid same destination BS node.

12. The GW node of claim 9, wherein the transceiver is further configured to receive a service request issued from a responding UE in response to paging, and wherein the paging-preparation process further comprises:
when the service request is received, performing:
removing one or more paging requests in the outgoing queue where the target UE identified in each of the one or more paging requests is the responding UE; and
updating the cache map with information on the BS node or the TA most-recently visited by the responding UE.

13. The GW node of claim 9, wherein the GW node is configured to be used in a wireless communication system compliant to a Long Term Evolution (LTE) specification.

14. The GW node of claim 13, wherein the GW node is further configured to be a femtocell GW.

* * * * *